No. 842,610. PATENTED JAN. 29, 1907.
W. D. ARMSTRONG.
ANIMAL TRAP.
APPLICATION FILED MAR. 9, 1906.
2 SHEETS—SHEET 2.
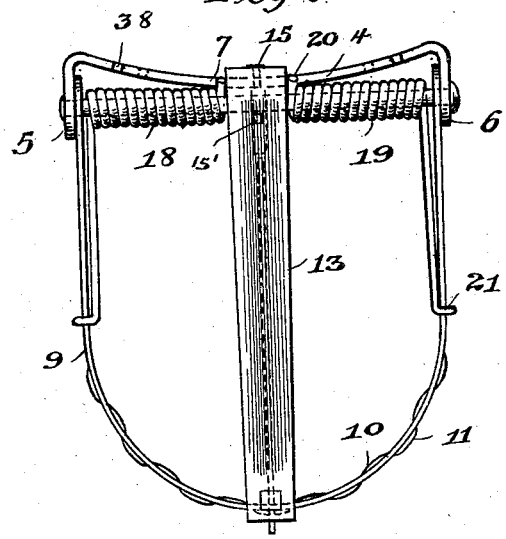
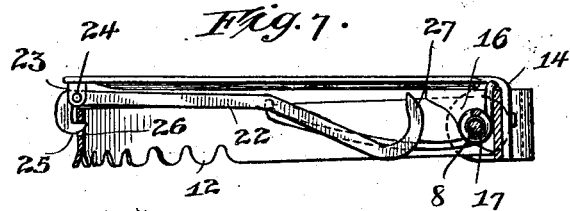

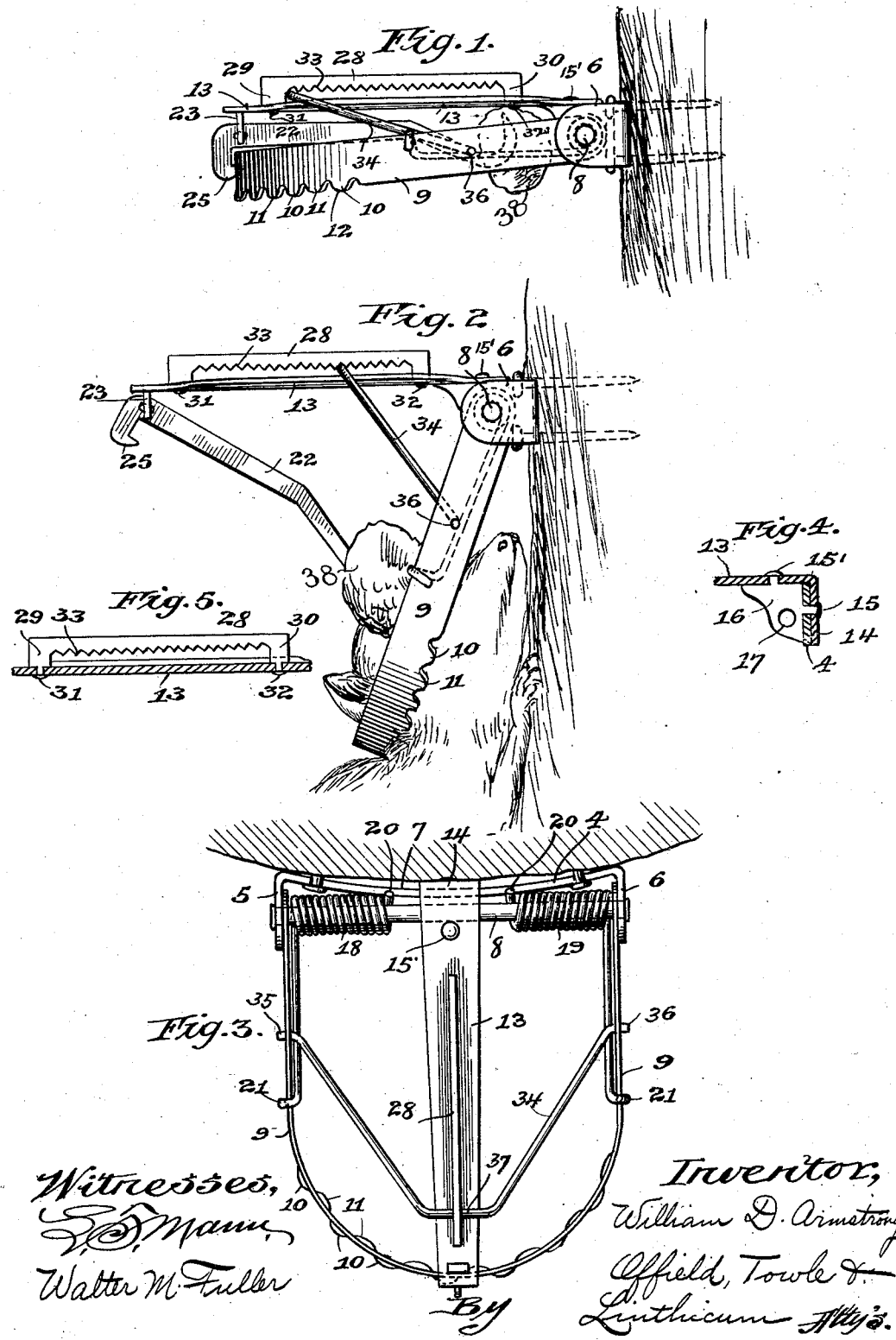

UNITED STATES PATENT OFFICE.

WILLIAM D. ARMSTRONG, OF ABINGDON, ILLINOIS, ASSIGNOR TO THE ANIMAL TRAP COMPANY, OF ABINGDON, ILLINOIS, A CORPORATION OF ILLINOIS.

ANIMAL-TRAP.

No. 842,610.

Specification of Letters Patent.

Patented Jan. 29, 1907.

Application filed March 9, 1906. Serial No. 305,117.

*To all whom it may concern:*

Be it known that I, WILLIAM D. ARMSTRONG, a citizen of the United States, residing at Abingdon, in the county of Knox and State of Illinois, have invented certain new and useful Improvements in Animal-Traps, of which the following is a specification.

My invention relates to improvements in animal-traps; and my novel device is especially adapted to trap those animals that inhabit trees, and therefore I have shown my invention as applied to and supported upon a tree-trunk, although it is obvious that my improvements may be used in traps otherwise supported.

One of the objects of my invention is to provide a powerful trap of simple construction, easy to affix and set, and which will be certain and efficient in action.

Another object of my invention is to so construct the trap that it will effect the immediate death of the animal and at the same time not injure the hide or fur, as frequently occurs where sharp-pointed double-jaw traps are employed, and a further object is to provide means for preventing the escape of the animal when once caught by forcing the jaw toward its set or open position.

My improved trap comprises in the preferred construction a base member to be secured to a support—say a tree—a single hinged jaw, which is locked in its open position by a trigger, one or more springs for actuating the jaw, a standard rigidly attached to the base member, a bait-holding trigger carried by the standard and pivotally connected thereto, and a ratchet-bar mounted upon the standard in which a bail pivotally mounted on the jaw is adapted to seat itself, and thereby prevent a backward movement of the jaw when once released. I prefer to make the trap wholly of steel or partly of malleable iron and the parts of simple form and so related and combined as to make the trap powerful and highly efficient.

With these and other objects in view the invention consists of certain novel features of construction and arrangement of parts, as will be more fully described, and particularly pointed out in the appended claims.

In the accompanying drawings, Figure 1 is a side elevation of the preferred form of my improved trap secured to a tree or similar support in set condition and baited. Fig. 2 is a similar view of the trap in released condition, the spring-actuated jaw gripping the animal about the neck. Fig. 3 is a plan view of the trap in set condition. Fig. 4 is a sectional detail view showing the manner of attaching the bracket to the base and standard. Fig. 5 is a sectional view illustrating the attachment of the ratchet-bar to the standard. Fig. 6 is a plan view of a modified type of trap in which the ratchet and lockingbail are omitted. Fig. 7 is a longitudinal section of the device illustrated in Fig. 6, and Fig. 8 is a view showing the manner of securing the trap to a tree and its operation in catching animals.

Referring to Figs. 1, 2, 3, and 4 of the drawings, 4 represents the base member, having laterally-bent ends 5 and 6, the base being slightly concave, as shown at 7, to render it stronger and to adapt it for attachment to a tree-trunk. 8 is a rod connecting the bent ends of the base member, its ends being headed over on the outer faces of the laterally-bent portions 5 and 6. 9 is a U-shaped jaw apertured at its ends to receive the rod 8, which forms its pivotal axis. The jaw is provided on its lower edge with a series of alternately and oppositely bent teeth 10 and 11, rounded at their ends, as shown at 12. The base member carries a standard 13, which has an angularly-bent end 14, snugly fitting the side of the base. In order to firmly secure the standard 13 to the base 4 and effectually support the same, I employ a triangular-shaped bracket 16, having two integral lugs or rivets 15 and 15', the former of which passes through apertures in the base 4 and end 14 of standard 13, the outer end of the rivet being headed to hold the parts together. I likewise pass the lug 15' through a hole in the standard 13 and head its end so as to effectually hold the standard in place and support the same. Bracket 16 is apertured at 17 to receive the rod 8, thereby preventing its bending under the strain of the springs 18 and 19, which are coiled about the rod, one of their ends bearing upon the base member at 20 and the other end curved and bearing upon the upper edge of the jaw 9, as shown at 21.

I have shown and prefer to employ a pair of springs; but obviously a single spring, if of sufficient strength, might be used. These springs are desirably made from heavy steel wire, and the coils are wound closely about rod 8, one extremity of each spring being extended across the rod 8 transversely to the axis of the coils and the other extremity of the spring being extended parallel to the side of the jaw and hooked over the edge at about the middle of its length.

The standard 13 is preferably dished or slightly concaved on its top surface to increase its strength, and the teeth of the jaw are staggered to increase their efficiency in holding and also to strengthen the jaw, the weakest part of which is the arch. The standard is preferably made about the same length as the jaw and carries a trigger 22, secured to the standard at one end by the pivot-lugs 23 and pivot-pin 24, the lugs being attached by any of the well-known means, such as riveting. This trigger may be of sheet-steel and has its ends oppositely curved, one being provided with a hooked projection 25, adapted to seat itself in the aperture 26 in the jaw, and the other end 27 being adapted to receive the bait.

In order that the animal when once caught may not escape by forcing the jaw back, and thereby release itself, I provide a ratchet-bar 28, having integrally-formed ends 29 and 30 and secured to the standard 13 by the rivets or pins 31 and 32, preferably formed integrally with said ends. The under side of this bar has ratchet-teeth 33, formed short enough to leave a space between the back of the standard and their points within which a bail 34 is confined, the bail having its ends bent to provide the pivots 35 and 36, which are seated in openings in the sides of the jaw, and an intermediate bent portion 37, adapted to seat itself against one of the ratchet-teeth upon a movement of the jaw toward the standard. When the trap is in set or locked position, the bail is close to the end 29, (shown in Fig. 1.)

In order to secure the trap to a tree or other support, the base member is provided with notches or cut-away portions 38, in which nails or the like may be driven; but it is obvious that it may be held in various other ways.

In use the baited trap may be secured to a tree-body or other support in the position indicated in the figures of the drawings and set by forcing the jaw back until the hooked projection or latch 25 at one end of the trigger seats itself in the aperture 26 of the jaw. The animal when attracted by the bait 38 hung on the hook 27 attempts to remove it by pulling it off the trigger, which is so shaped that any strain thereon immediately unseats or releases the latch and frees the jaw, the latter being immediately snapped down by the powerful spring, catching the head of the animal between the jaw and the tree or other support to which the trap is affixed. Escape from the trap by raising the jaw 9 is effectually prevented by the bail 34 engaging the nearest tooth on the ratchet-bar 28.

A trap of the type described above works effectually even without the ratchet mechanism, and in Figs. 6, 7, and 8 I have illustrated such a modification, which in all other respects is like the device shown in Figs. 1 to 5, inclusive.

It is obvious that various changes might be made in my invention without departing from the spirit thereof, such as the many well-known arrangements and shapes of teeth or the method of securing the trap to any support; but

What I claim, and wish to secure by Letters Patent, is—

1. In a trap of the class described, a base having its ends bent to form ears and adapted to be secured to a suitable support, a single jaw pivoted to said ears, a spring for actuating said jaw, a standard having one of its ends bent at substantially a right angle to said base and rigidly secured thereto, and a trigger pivoted to the standard and adapted to hold the jaw in set or open position, substantially as described.

2. In a trap of the class described, a base adapted to be secured to a suitable support and having its ends bent at substantially right angles to its body, a rod rigidly connecting said bent ends, a jaw pivotally mounted on said rod, a spring for actuating said jaw, a standard rigidly secured to the base and substantially perpendicular thereto, a bracket apertured for the passage of said rod and bearing on said base and standard, and a trigger pivoted to said standard and adapted to hold the jaw in locked position, substantially as described.

3. In a trap of the class described, a concaved base adapted to be secured to a suitable support, a single apertured jaw pivoted to the base, a series of springs for actuating said jaw, a standard rigidly connected to the base, a trigger pivoted to the standard adapted to be seated in the aperture in said jaw whereby the jaw is held in set or locked position, substantially as described.

4. In a trap of the class described, an apertured base adapted to be secured to a suitable support, a single jaw pivoted to the base, a pair of springs for actuating said jaw, an apertured standard, a bracket having rivets which pass through the apertures in said base and standard and are headed over to bind said parts together, and a trigger pivoted to said standard and adapted to hold the jaw in locked position, substantially as described.

5. In a trap of the class described, a concaved base adapted to be secured to a suitable support and having its ends bent at substantially right angles to the body, a rod rigidly connecting said bent ends, a jaw pivotally mounted on said rod, a series of staggered teeth upon the jaw, a spring for actuating said jaw, a standard rigidly secured to said base and substantially perpendicular thereto, a bracket apertured for the passage of said rod and bearing on said base and standard, and a trigger pivoted to the standard and adapted to hold the jaw in set position, substantially as described.

6. In a trap of the class described, the combination of an apertured base, an apertured standard, and a bracket having lugs or rivets which pass through the apertures in said base and standard and are headed over to bind the parts together, substantially as described.

7. In a trap of the class described, the combination of a base adapted to be secured to a support, a jaw pivotally mounted on said base, a spring to actuate said jaw, a standard mounted on said base, a trigger on said standard coöperating with said jaw to retain it in set position, a ratchet, and a pawl on said jaw coacting with said ratchet to prevent movement of said jaw in opposition to the action of said spring after the trigger has been tripped, substantially as described.

8. In a trap of the class described, the combination of a base adapted to be secured to a support, a U-shaped jaw provided with an aperture, the legs of which are pivotally attached to said base, a spring to actuate said jaw, a standard projecting outwardly from said base, a trigger to support the bait adapted to engage the aperture in said jaw and retain the same in set position, a ratchet-bar mounted on said standard, and a wire bail whose ends are pivotally attached to said jaw and whose central portion coöperates with said ratchet to prevent movement of said jaw in opposition to the action of said spring, substantially as described.

9. A trap of the class described having a jaw provided on one edge with rounded staggered teeth, substantially as described.

WILLIAM D. ARMSTRONG.

Witnesses:
W. A. THOMAS,
STRAWTHER GIVENS.